Figure 2:
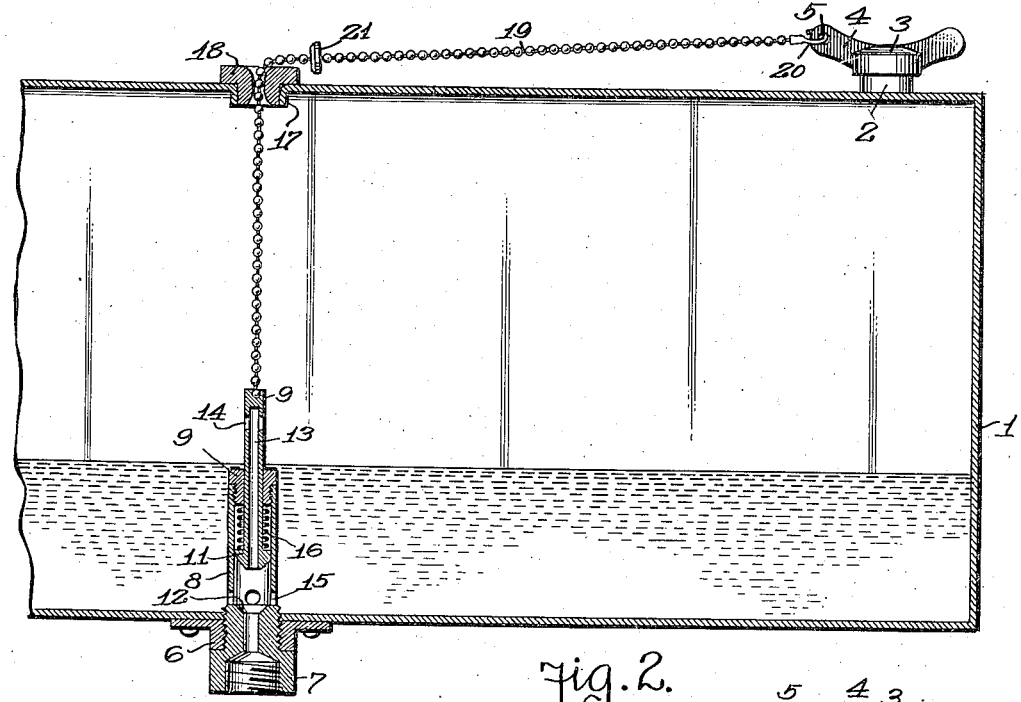

Jan. 2, 1923.

G. A. YOUNG.
EMERGENCY FUEL SUPPLY FOR TANKS.
FILED SEPT. 10, 1921.

1,440,520.

Inventor
George A. Young,
By Barthel & Barthel
Attorneys

Patented Jan. 2, 1923.

1,440,520

UNITED STATES PATENT OFFICE.

GEORGE A. YOUNG, OF DETROIT, MICHIGAN.

EMERGENCY FUEL SUPPLY FOR TANKS.

Application filed September 10, 1921. Serial No. 499,615.

*To all whom it may concern:*

Be it known that I, GEORGE A. YOUNG, a citizen of the United States of America, residing at Detroit, in the county of Wayne and State of Michigan, have invented certain new and useful Improvements in Emergency Fuel Supplies for Tanks, of which the following is a specification, reference being had therein to the accompanying drawings.

This invention relates to a reserve fuel device for fuel tanks and has special reference to that class of valves, chambers and reserve fuel devices placed in or about the fuel tank of an automobile, motor boat or other craft or vehicle for holding in reserve a small quantity of fuel which will permit the automobile to reach a service station or source of fuel supply after the main supply of fuel has been used. Such devices are ordinarily set when filling the fuel tank and after a reserve supply of fuel has been used the driver of the automobile very often forgets to again set the reserve fuel device with the result that the reserve supply of fuel is used along with the main supply of fuel and eventually the fuel tank is empty and no reserve supply to carry the automobile to a service station.

My invention aims to provide means for maintaining a reserve supply of fuel with the means constructed to be practically fool proof, that is, a fuel tank cannot be filled without said means being released or actuated to retain a reserve supply of fuel after the main supply has been used. The means which I employ includes a self closing valvular member through which the main supply of fuel passes, and when the valvular member is opened to release the reserve supply of fuel for use, said valvular member is held in such open position by the filling cap or closure member of the fuel tank, preventing the filling cap from being removed without releasing the valvular member, which automatically closes and thus places in reserve a quantity of the fuel placed in the tank.

My reserve fuel supply device may be easily installed in fuel tanks already forming part of the fuel supply system of an automobile, and the construction of the device and its operation will be hereinafter described and then claimed.

Reference will now be had to the drawing. wherein

Figure 1:
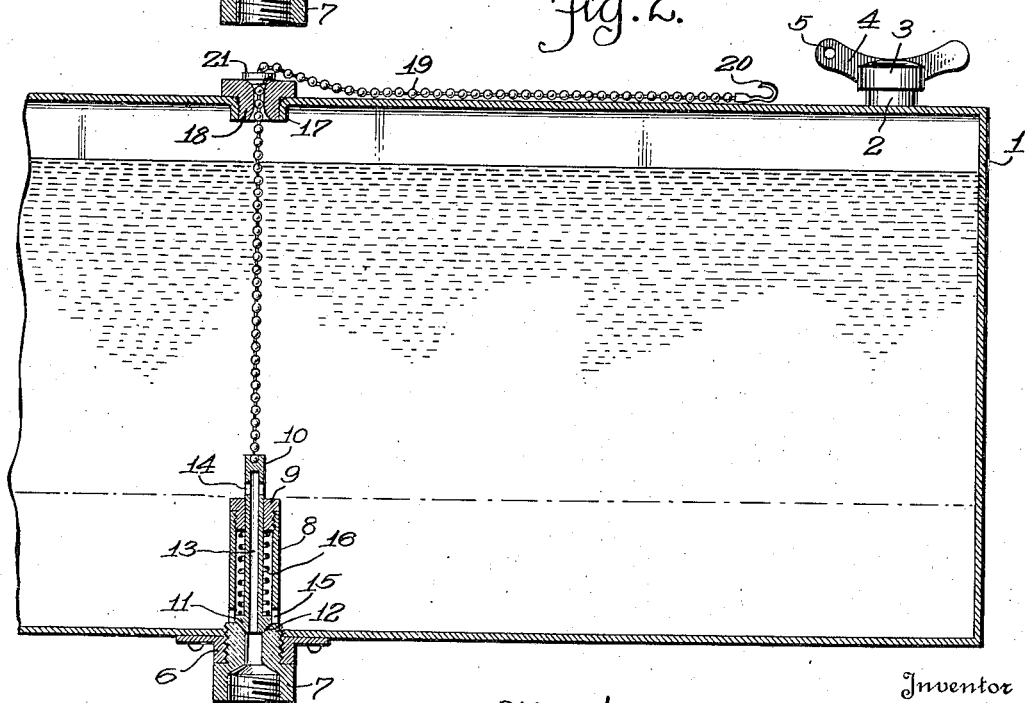

Figure 1 is a longitudinal sectional view of a portion of a fuel tank provided with the reserve fuel supply device and showing the device in position to permit of the main supply of fuel being used, and a reserve supply retained in the tank for emergency purposes, and Fig. 2 is a similar view showing the reserve fuel supply device set to release the reserve supply of fuel and at the same time hold the filling cap of the tank against removal until the reserve fuel device is released to assume the position shown in Fig. 1.

In the drawing, the reference numeral 1 denotes a fuel tank having its top wall provided with a filling connection 2 normally closed by a detachable winged cap 3 or other closure member which has a wing or portion 4 thereof apertured, as at 5. The cap 3 is of the conventional screw type and constitutes filling means for the tank.

The bottom wall of the tank 1 has an outlet 6 in which is usually mounted an outlet connection 7, and I use a somewhat similar outlet connection but combine it with a valve cylinder 8 that stands upright in the tank 1 a sufficient distance to maintain a reserve body or quantity of fuel in the tank 1; the level of such reserve supply of fuel being approximately in a plane with the upper end of the valve cylinder 8, as shown by dot and dash lines in Fig. 1, and by full lines in Fig. 2.

The upper or inner end of the cylinder 8 is provided with an apertured plug or guide 9 for a tubular or hollow valve rod 10 which is slidable in the plug or guide 9 and has its inner end provided with a valve 11 adapted to seat on a seat 12 at the inner end of the outlet connection 7 and shut off communication between the valve cylinder 8 and the outlet connection 7, without interfering with the passage 13 in the valve rod 10 which communicates with the outlet connection 7 and with the tank by virtue of lateral ports 14 in the upper end of the valve rod, such ports being above the level of the reserve fuel supply within the tank.

The lower end of the valve cylinder 8, at its juncture with the outlet connection 7, has lateral ports 15 adapted to establish communication between the tank 1 and the outlet connection 7, when the valve 11 is raised off of its seat 12, to permit of the reserve supply of fuel flowing through the ports 15 into the outlet connection 7, and said valve is normally held on its seat by the expansive force of a coiled spring 16 encircling the valve rod 7 between the valve 11 and the plug 9. This spring is placed under additional tension or stress when the valve 11 is unseated.

The top wall of the tank, above the valvular device just described, is provided with an opening 17 and a guide 18 mounted in said opening for a flexible member 19, preferably in the form of a ball chain having its inner end connected to the upper end of the valve rod 10 and its outer end provided with a hook 20 or other holdfast device that may be attached to the apertured ear 4 of the filling cap 3. A suitable stop 21 is located on the flexible member 19 to hold that portion of the member within the tank 1 taut and prevent the greater part of the flexible member from entering the tank. The top 21 is adapted to engage the guide 18 without interfering with a seating action of the valve 11.

The normal condition of the reserve fuel supply device as shown in Fig. 1, permits the main supply or greater part of the fuel flowing through the ports 14 into the valve rod passage 13 and through the outlet connection 7 to be used for power purposes, until the level of fuel is below the ports 14, when there will be a cessation in the flow of fuel with the reserve supply in the bottom of the tank about the valve cylinder 8.

In order that the reserve supply of fuel may be used it is necessary to manually raise the valve 11 and this is accomplished by pulling upwardly on the flexible member 19 and attaching said member to the filling cap 3. If not attached the valve 11 would close and prevent the use of the reserve supply of fuel, but since the valve is raised against the action of the spring 16, the reserve supply of fuel may flow through the ports 15 and the outlet connection 7 and pass on to the carbureter of an engine.

Since the flexible member 19 is attached to the filling cap 3 the filling cap cannot be unscrewed, to permit of the tank 1 being replenished, until the flexible member 19 is detached and this very act permits the expansive force of the spring 16 to close the valve 11, thus re-establishing the normal condition of the device. It is therefore practically impossible for the tank 1 to be refilled without the reserve fuel supply device being restored to normal position, consequently a reserve or emergency supply of fuel will be positively retained within the tank after the main supply of fuel has been used. If the flexible member 19 is simply attached to the guide member 18 then there would be danger of the tank being refilled without releasing the valve 11, but since said valve is held unseated by attachment to the filling means of the tank, it is obvious that when the flexible member is released to permit of the tank being refilled, that the reserve fuel supply device will be restored to normal position.

I do not care to confine my invention to the specific manner of attaching the flexible member to the filling cap, nor to the specific construction of the valve, and such other changes as are permissible by the appended claim may be resorted to without departing from the scope of the invention.

What I claim is:—

A fuel tank having an outlet and an inlet set to one side of the axis of the outlet and the inlet normally closed by a detachable screw cap, a valve cylinder upstanding in said tank at the outlet thereof, and having its lower end ported so that fuel in the bottom of said tank may flow through the outlet of said tank, a plug in the upper end of said valve cylinder, a valve in said valve cylinder, a hollow rod carried by said valve and extending through said plug and normally establishing communication between the upper part of said tank and the outlet thereof, means in said cylinder about said hollow rod between said plug and valve holding said valve normally seated to shut off communication between the bottom of said tank and its outlet, a guide in the top of said tank vertically alining with said valve cylinder, and valve operating means extending through said guide and adapted to extend along said tank for attachment to said screw cap.

In testimony whereof I affix my signature in presence of two witnesses.

GEORGE A. YOUNG.

Witnesses:
ANNA M. DORR,
KARL H. BUTLER.